(12) United States Patent
Briere et al.

(10) Patent No.: US 10,602,875 B2
(45) Date of Patent: Mar. 31, 2020

(54) MACHINE FOR DISPENSING BEVERAGES FROM A POD, COMPRISING A DEVICE FOR THE SYNCHRONIZED INJECTION OF TWO VOLUMES OF AIR

(71) Applicant: SEB S.A., Ecully (FR)

(72) Inventors: Matthieu Briere, Gemeaux (FR); Arnaud Riva, Dijon (FR); Quentin Dos Santos, Dijon (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 16/075,036

(22) PCT Filed: Feb. 2, 2017

(86) PCT No.: PCT/FR2017/050238
§ 371 (c)(1),
(2) Date: Aug. 2, 2018

(87) PCT Pub. No.: WO2017/134391
PCT Pub. Date: Aug. 10, 2017

(65) Prior Publication Data
US 2019/0045967 A1    Feb. 14, 2019

(30) Foreign Application Priority Data

Feb. 4, 2016   (FR) ..................................... 16 50909

(51) Int. Cl.
*A47J 31/40*      (2006.01)
*F04B 3/00*       (2006.01)
(Continued)

(52) U.S. Cl.
CPC ........... *A47J 31/407* (2013.01); *A47J 31/405* (2013.01); *F04B 3/003* (2013.01); *F04B 13/02* (2013.01); *A47J 31/32* (2013.01)

(58) Field of Classification Search
CPC ........ A47J 31/407; A47J 31/425; A47J 31/32; F04B 3/003; F04B 13/02
(Continued)

(56) References Cited

U.S. PATENT DOCUMENTS 2,454,602 A * 11/1948 Gunther .................... A61L 2/26
                                                           206/210
3,474,965 A * 10/1969 Coleman ............. B01F 15/0458
                                                           134/100.1
(Continued)

OTHER PUBLICATIONS

International Preliminary Report on Patentability and the Written Opinion of the International Searching Authority as issued in International Patent Application No. PCT/FR2017/050238, dated Aug. 7, 2018.
(Continued)

*Primary Examiner* — Dana Ross
*Assistant Examiner* — Kuangyue Chen
(74) *Attorney, Agent, or Firm* — Pillsbury Winthrop Shaw Pittman LLP

(57) ABSTRACT

A machine for dispensing beverages includes a pod including at least two cavities each cavity containing a volume of ingredients forming part of a composition of the beverage, the machine further including an air injection device configured to supply at least two volumes of air in a synchronized manner, the at least two volumes of air being adapted respectively to the volumes of ingredients in the at least two cavities, the injection device including an air pump including two chambers and two pistons slidably mounted respectively in the two chambers, and an actuator configured to actuate the two pistons in a synchronized manner.

19 Claims, 5 Drawing Sheets

(51) Int. Cl.
*F04B 13/02* (2006.01)
*A47J 31/32* (2006.01)

(58) Field of Classification Search
USPC .......................................................... 99/295
See application file for complete search history.

(56) References Cited

U.S. PATENT DOCUMENTS

| | | | | |
|---|---|---|---|---|
| 4,927,567 | A * | 5/1990 | Rudick | B01F 3/04269 261/104 |
| 5,309,820 | A * | 5/1994 | Baxter | A47J 31/043 99/280 |
| 5,381,926 | A * | 1/1995 | Credle, Jr. | B67D 1/0032 222/1 |
| 5,392,694 | A * | 2/1995 | Muller | A47J 31/36 99/295 |
| 2004/0129727 | A1* | 7/2004 | Foster | B05B 11/3084 222/137 |
| 2008/0118378 | A1* | 5/2008 | Baron | B67D 1/108 417/412 |
| 2014/0225285 | A1* | 8/2014 | Hansen | A47J 31/0605 261/26 |
| 2015/0050392 | A1* | 2/2015 | Stonehouse | B65D 81/32 426/115 |
| 2017/0058065 | A1* | 3/2017 | Aida | C08F 2/06 |

OTHER PUBLICATIONS

International Search Report as issued in International Patent Application No. PCT/FR2017/050238, dated Jun. 1, 2017.

* cited by examiner

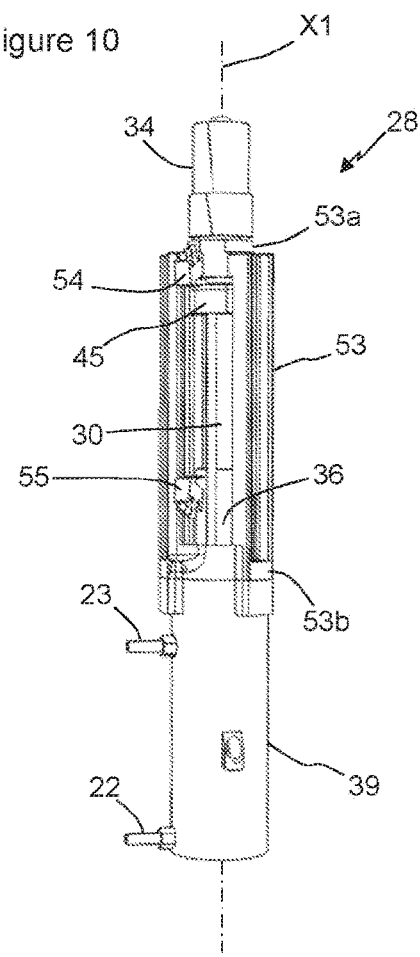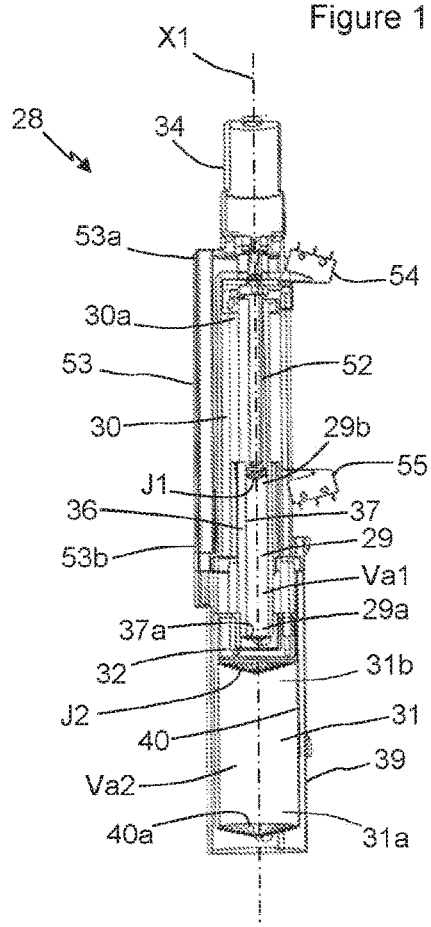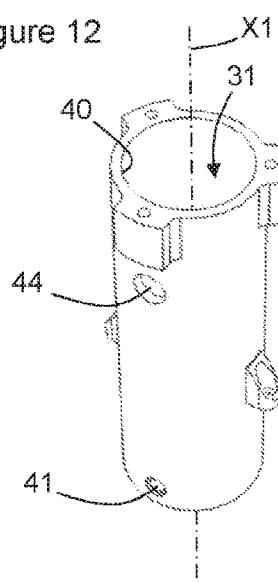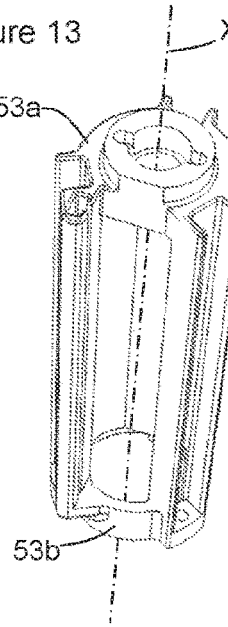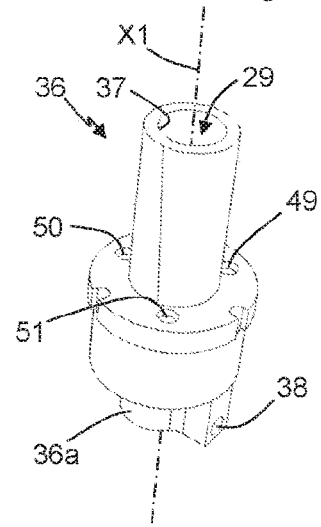

Figure 15
Figure 16
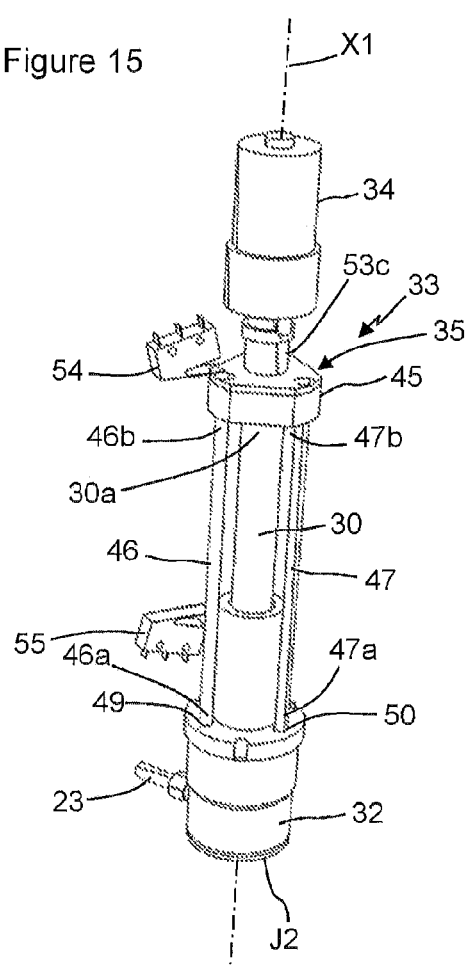
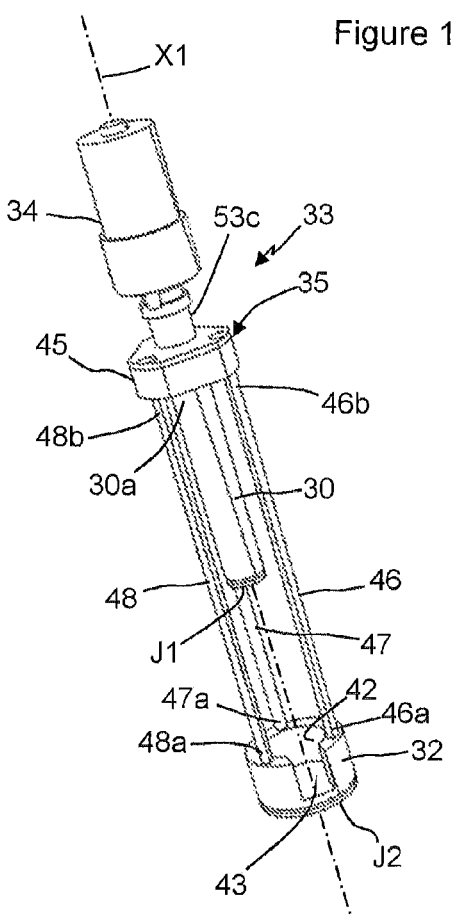
Figure 17
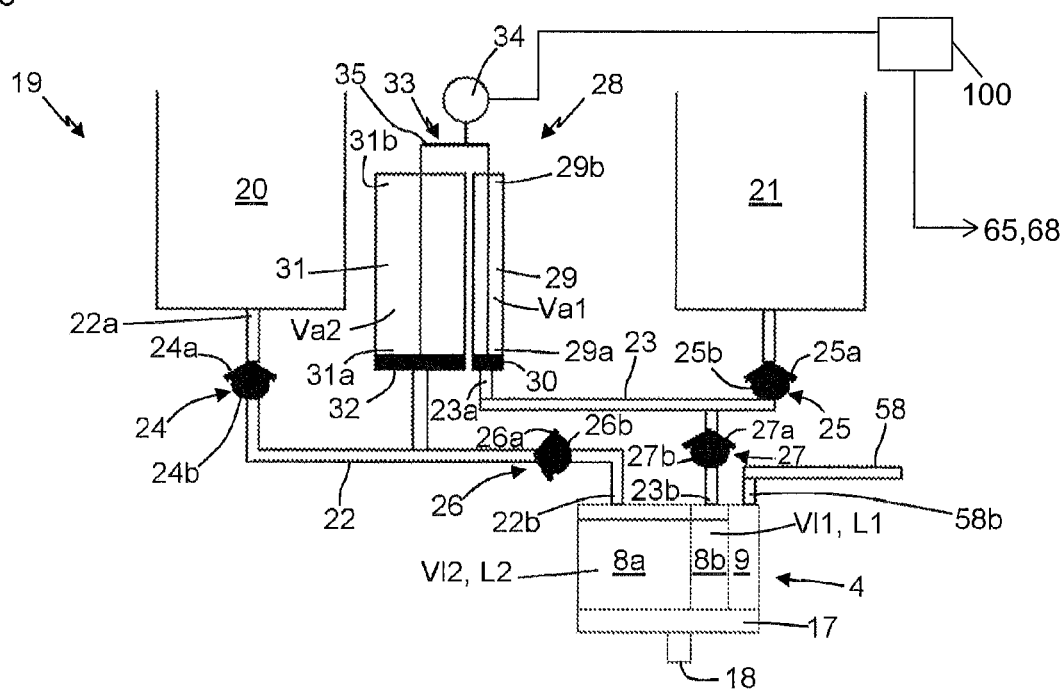

MACHINE FOR DISPENSING BEVERAGES FROM A POD, COMPRISING A DEVICE FOR THE SYNCHRONIZED INJECTION OF TWO VOLUMES OF AIR

CROSS-REFERENCE TO RELATED APPLICATIONS

This application is the U.S. National Stage of PCT/FR2017/050238 filed Feb. 2, 2017, which in turn claims priority to French patent application number 1650909 filed Feb. 4, 2016. The content of these applications are incorporated herein by reference in their entireties.

This invention concerns a machine for dispensing beverages from a pod and has the principal objective of optimizing the dispensing of fluids during preparation of a beverage.

"Pod" means a capsule comprising one or more cavities, each cavity containing an ingredient, in particular a liquid, forming part of the composition of the beverage, these ingredients being intended to be mixed with water during preparation of the beverage.

In a particular embodiment, the pod consists of a capsule comprising several cavities, each cavity containing an ingredient, a channel allowing water to be dispensed, and a mixing chamber. The pod is configured to separate the mixing chamber from the cavities and from the channel, in an initial mode, and to cause the mixing chamber to communicate with the cavities and with the channel, in a beverage preparation mode. In addition, the machine comprises air injection means and water injection means, configured to perforate the pod and to inject air and water into the cavities and into the channel, respectively, in the beverage preparation mode. In this preparation mode, the air injected into the cavities pushes the ingredients into the mixing chamber and, concomitantly, the water injected into the channel is transferred into said mixing chamber, which allows the ingredients to mix with the water before the beverage obtained is released into a container, such as a glass or tumbler.

STATE OF THE ART

The currently known machines for dispensing beverages from a pod comprise a device for dispensing at least one defined volume of water into the pod. The dispensing device is configured to perforate the pod and inject water into this pod. The pod contains one or more ingredients arranged in separate cavities. At the time the beverage is prepared, the water may be injected directly into the cavity when there is a single ingredient. When there are several ingredients, the latter are transferred into a mixing chamber and the water is injected into this mixing chamber. The injected water gradually dilutes the ingredient or ingredients, the mixture gradually flowing into a container such as a tumbler, glass or cup.

At the beginning of dispensing, the mixture that flows into the container is highly concentrated and, conversely, at the end of dispensing, this mixture is highly diluted, and there may even be nothing left but water flowing into the container. This variation in concentration has the disadvantage of preparing a beverage with a heterogeneous mixture in the container.

This heterogeneity of the mixture in the container during preparation of the beverage is accentuated when there are several ingredients in the pod. In fact, during preparation of the beverage, these ingredients are mixed in a random manner with the water injected into the pod's mixing chamber.

SUMMARY OF THE INVENTION

The objective of this invention is to implement a beverage-dispensing machine that remedies this disadvantage.

For this purpose, the invention concerns a machine for dispensing beverages from a pod comprising at least two cavities, each cavity containing a volume of ingredient forming part of the composition of the beverage. The pod also comprises a channel allowing water to be dispensed, and a mixing chamber into which the ingredients are transferred during the preparation of the beverage, and into which the injected water that passes through the channel is transferred.

The dispensing machine comprises a device for injecting air into the cavities, configured to supply at least two volumes of air in a synchronized manner, said volumes of air being adapted respectively to the volumes of ingredients in said cavities. The air injection device allows the ingredients to be discharged steadily from the cavities, so that they can be transferred gradually into the mixing chamber throughout the preparation of the beverage. This allows the ingredients to be diluted homogeneously with water in this mixing chamber, said homogeneous mixture being released gradually into a container. Since the volumes of air supplied are adapted to the volumes of ingredients, all of the ingredients are discharged.

Preferably, the injection device comprises an air pump with two chambers and two pistons slidably mounted respectively in the two chambers. This air pump also comprises means for actuating the two pistons in a synchronized manner. In one embodiment of the dispensing machine, the actuation means comprise at least one motor and at least one transmission element configured to maneuver the two pistons concomitantly. The use of a motor allows the pistons to be manipulated with great precision of movement. This contributes to dispensing the ingredients in a precise and reproducible manner each time, in order to guarantee homogeneity of the beverage during its preparation.

In a preferred embodiment, the actuation means comprise a single motor and a single transmission element, configured to maneuver the two pistons concomitantly. Preferably, the two chambers and the two pistons are all coaxial. Preferably, the motor, the transmission element, the two chambers and the two pistons are all coaxial. This design makes it possible to greatly reduce the footprint of the injection device and to use actuation means guaranteeing the simultaneity of the translational movements of the pistons in the chambers, without risk of blockage by bracing at the sliding connections. One could envision a variant with separate chambers, each chamber receiving a piston, said pistons being actuated concomitantly by means of a single motor and a suitable transmission element, or even by means of two separate motors controlled in a synchronized manner by a control circuit.

Advantageously, the injection device comprises two air tanks and two dispensing circuits whose upstream extremities are connected to the two tanks, respectively. The two chambers of the air pump are connected to the two dispensing circuits, respectively. In addition, two first check valves are arranged respectively on the two dispensing circuits between the tanks and the pump. These two first check valves ensure air flow from the outlets of said two dispensing circuits, during the discharge of the air contained in the chambers. In a preferred embodiment, the injection device also comprises two second check valves arranged respectively on the dispensing circuits between the pump and the downstream extremities of said circuits. This prevents the creation of a pressure change in the storage cavities when the dispensing needles pierce the pod, because of the presence of air in the dispensing circuits, which could cause the ingredients, in particular liquid ones, to flow prematurely into the mixing chamber of the pod before water is dispensed into this mixing chamber.

In one embodiment of the dispensing machine, the volumes of air supplied to the cavities are about 5% to 20% greater, preferably 20% greater, than the volumes of ingredients contained in said cavities. This guarantees the flow of the entire quantity of ingredient contained in the cavity.

Preferably, the machine for dispensing beverages comprises a device for dispensing at least one defined volume of water into the pod. This dispensing device comprises a tank, a dispensing circuit connected at its upstream extremity to the tank, and a pumping system arranged on the dispensing circuit. In a preferred embodiment, the pumping system comprises:

- a water pump equipped with a chamber connected to the dispensing circuit, and a piston slidably mounted in a leak-tight manner in the chamber;
- means for actuating the piston, so as to suction at least one volume of water and to discharge said at least one volume of water;
- a first check valve arranged on the dispensing circuit between the tank and the pump and
- a second check valve arranged on the dispensing circuit between the pump and the downstream extremity of said circuit.

During actuation of the piston causing the suction of the water in the chamber, the check valves ensure that the water contained in the tank will be drawn off without risk of suction of fluid from the outlet of the dispensing circuit. Conversely, during actuation of the piston causing the discharge of the water contained in the chamber, said check valves ensure that the water will be released by the outlet of the dispensing circuit, without possibility of water being discharged into the tank. In addition, this pump design guarantees precise and reproducible suction and discharge of the quantity of water, and the presence of said check valves means that said suction and discharge will not be marred by error.

In one embodiment of the dispensing machine, the water dispensing device comprises a system for purging a volume of water contained in the dispensing circuit, downstream from the first check valve. This prevents residual stagnant water from staying inside the dispensing circuit during a more or less prolonged period between two beverage preparations, so that a quality beverage is supplied at each dispensing, while adhering to good food hygiene.

In the presence of a purge system as noted above, the machine is configured so that the water pump discharges a volume of water, and the volume of purged water added to said volume of discharged water constitute the volume of water allowing the beverage to be prepared. Thus, the purge water takes part in the preparation of the beverage, which avoids water wastage and the need to add a purged water collecting vessel to the machine.

Advantageously, the dispensing device comprises a system for detection of the piston's position in the chamber. This detection system is configured to act on the actuation means, so that the water pump is able to suction and discharge at least two volumes of water. This allows at least two quantities of water to be dispensed accurately for the preparation of two beverages from two types of pods containing different ingredients or different quantities.

Preferably, the dispensing machine comprises a control circuit configured to activate concomitantly the injection device and the dispensing device. This helps to ensure a homogeneous mixture of the ingredients with the water throughout the preparation of the beverage. Preferably, the control circuit is configured to activate the injection of a volume of water during a time T1, and then the purge of the circuit during a time T2, on the one hand, and the injection of air into the pod during the time T1+T2, on the other hand. Thus, the volume of discharged water flows during the time T1 and the volume of purged water flows during the time T2, into the channel of the pod. And concomitantly, air is injected into each cavity of the pod during the total time T1+T2. This ensures homogeneity of the mixture, while making use of the volume of purged water.

BRIEF DESCRIPTION OF THE FIGURES

The following description demonstrates the characteristics and advantages of the beverage-dispensing machine covered by the invention, according to a preferred and non-restrictive design. This description is supported by figures, among which:

FIG. 10 illustrates an overall view of an air pump of the air injection device, and FIG. 11 illustrates an overall cross-sectional view of said air pump, FIGS. 12 to 16 illustrate different components of the air pump illustrated in FIGS. 10 and 11, FIG. 17 is a basic diagram of the air injection device showing these various components.

DETAILED DESCRIPTION

The machine 1 for dispensing beverages will be called "machine 1" in the rest of the description.

Figure 1:
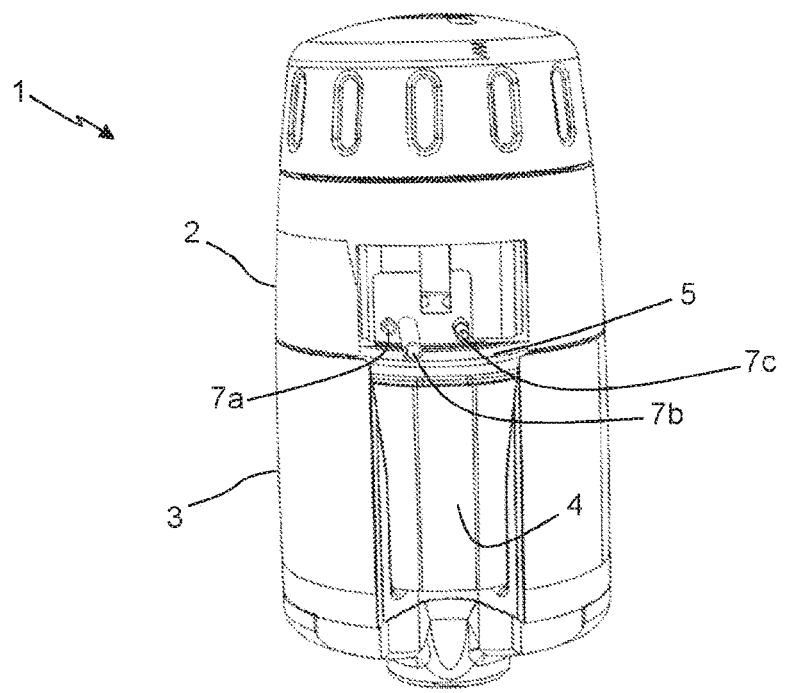
FIG. 1 illustrates a partial overall view of the dispensing machine according to the invention.
Figure 3:
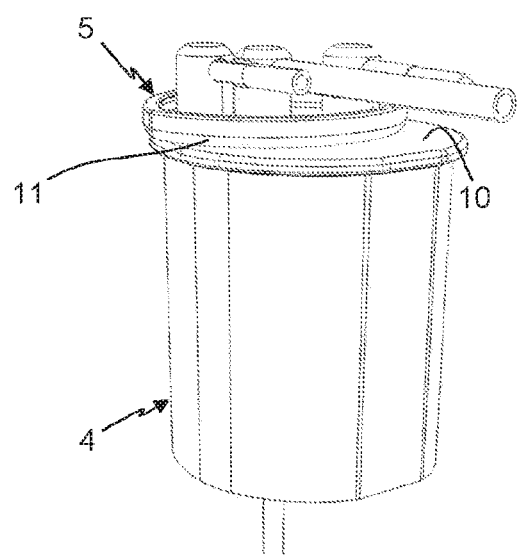
FIG. 3 illustrates this needle holder in an engaged position on the pod.
Figure 2:
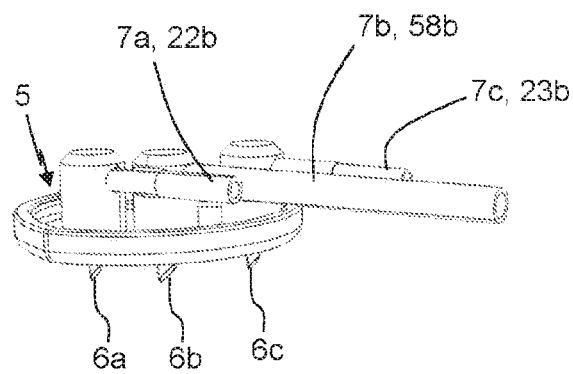
FIG. 2 illustrates a needle holder allowing fluids to be dispensed into the pod.

As illustrated in FIG. 1, the machine 1 comprises a frame 2 and a receptacle 3 for receiving a pod 4. The frame 2 includes a device (not illustrated) for moving a needle holder 5 which can be engaged on the pod 4, as illustrated in FIGS. 1 to 3. The receptacle 3 is articulated in relation to said frame 2 such that it can be arranged either in an open position, where the pod 4 can be inserted into the receptacle 3, or in a closed position, where the needle holder 5 can be engaged on the pod 4.

Figure 4:
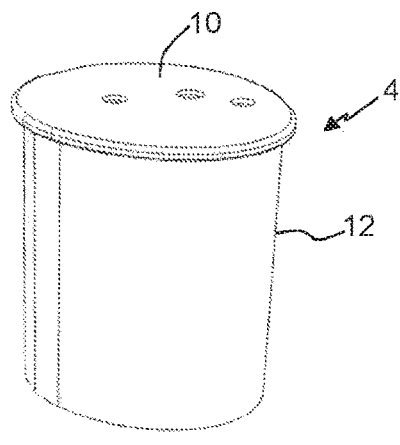
FIGS. 4 to 9 illustrate a non-restrictive embodiment of a pod.
Figure 5:
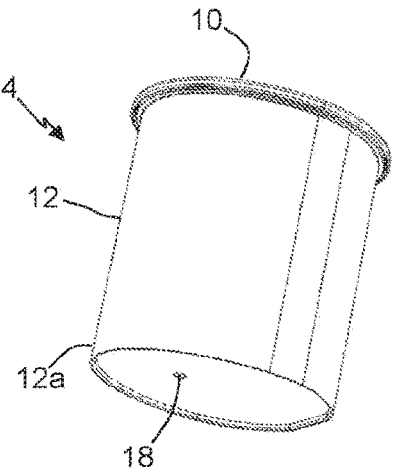
Figure 6:
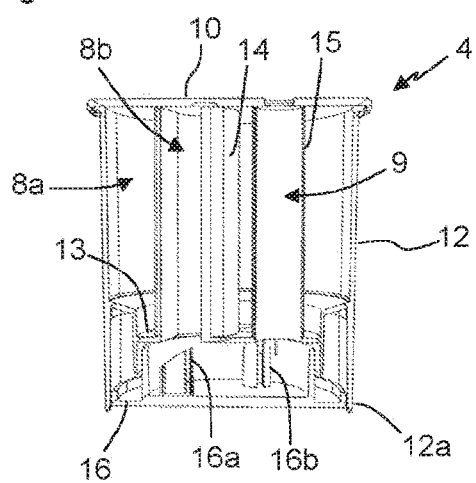
Figure 7:
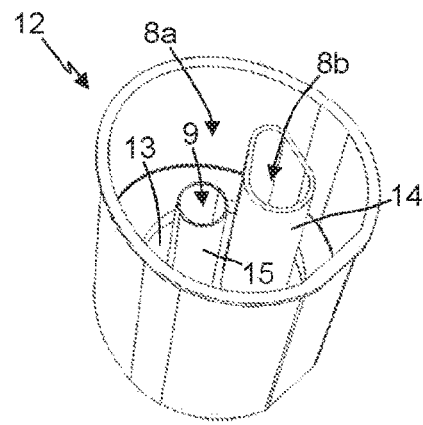
Figure 8:
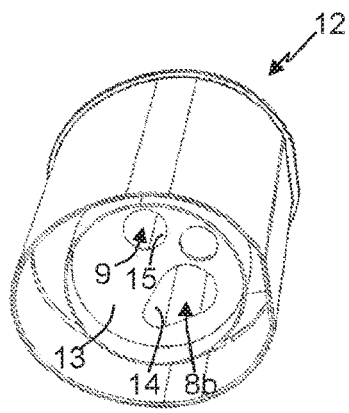
Figure 9:
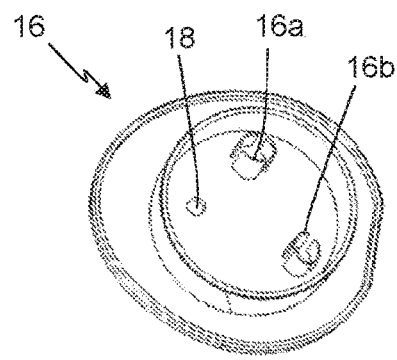

The needle holder 5 receives three needles 6a, 6b, 6c connected to conduits 7a, 7b, 7c allowing fluids to be dispensed. The number of needles and the types of fluids dispensed, in particular air or water, depend on the design of the pod 4. In this instance, the machine 1 is configured to receive a pod 4 comprising two cavities, 8a, 8b, each cavity containing an ingredient L1, L2 (diagrammed in FIG. 17), and a channel 9 for dispensing water, as illustrated in FIG. 7. When the needle holder 5 is engaged on the pod 4, the needles 6a, 6b, 6c perforate the seal 10 of the pod 4, illustrated in FIG. 4, and position themselves respectively in the upper parts of the two cavities 8a, 8b and of the channel 9.

As illustrated in FIG. 3, a surface gasket 11 is arranged on the lower face of the needle holder 5, said needles 6a, 6b, 6c passing through said gasket 11. When the needle holder 5 is in an engaged position on the pod 4, this gasket 11 comes properly into contact with the surface of the seal 10 of the pod 4, which eliminates the venting of the cavities 8a, 8b and of the channel 9 of the pod 4 after this seal 10 is perforated by the needles 6a, 6b, 6c and during the injection of fluids inside said pod 4. This guarantees perfect control of the volumes of fluids injected into the pod 4.

As illustrated in FIGS. 4 to 9, the pod 4 comprises a body 12 comprising an intermediate surface 13 and walls 14, 15 defining the two cavities 8a, 8b and the channel 9. The intermediate surface 13 is covered with a film (not represented in the figures) to close the cavities 8a, 8b. The pod 4 also comprises a movable bottom 16 arranged in a sliding manner in the body 12, below the intermediate surface 13. The movable bottom comprises two needles 16a, 16b. During the placement of the needle holder 5 on the seal 10 of the pod 4, the movable bottom 16 slides in the body 12 until it reaches the intermediate surface 13. The needles 16a, 16b perforate the film, which permits the activation of the pod 4 and the constitution of a mixing chamber 17 (diagrammed in FIG. 17) between the bottom of the movable bottom 16 and the wall 13. This mixing chamber 17 communicates with the two cavities 8a, 8b and the channel 9, which allows the ingredients and the water inside this mixing chamber 17 to be dispensed during the dispensing of fluids for the preparation of the beverage, which gradually flows through an outlet opening 18 arranged in the movable bottom 16. Other pod 4 designs may be envisioned with an equivalent operating principle.

The position of the needles 6a, 6b, 6c on the needle holder 5 will depend on the configuration of the pod 4 and the position of the cavities 8a, 8b and of the channel 9 inside the body 12. In the rest of the description, we consider that the needles 6a, 6c penetrate respectively the cavities 8a, 8b, and that the needle 6b penetrates the channel 9.

The needles 6a, 6c allow air to be injected into the cavities 8a, 8b which each contain an ingredient L1, L2. This air injection is performed using an air injection device 19 diagrammed in FIG. 17. The air injection device 19 comprises two tanks 20, 21, each tank containing air, and two dispensing circuits 22, 23, whose upstream extremities 22a, 23a are connected respectively to the tanks 20, 21, and whose downstream extremities 22b, 23b are connected respectively to the conduits 7a, 7c connected to said needles 6a, 6c. The air injection device 19 comprises two first check valves 24, 25 which are arranged respectively at the upstream extremities 22a, 23a on the dispensing circuits 22, 23. Likewise, the air injection device 19 comprises two second check valves 26, 27, which are arranged respectively at the downstream extremities 22b, 23b on the dispensing circuits 22, 23. These first and second check valves 24-27 each comprise a seat 24a-27a, a ball 24b-27b and a spring element (not illustrated), and are very sensitive in order to open and close very quickly, so as to perfectly control the quantities of air injected into the cavities 8a, 8b on the pod 4.

As diagrammed in FIG. 17, the air injection device 19 comprises an air pump 28 which comprises a first chamber 29 slidably receiving a first piston 30 and a second chamber 31 slidably receiving a second piston 32. The two pistons 30, 32 are moved simultaneously in the respective chambers 29, 31 by means of actuating means 33 comprising a motor 34 and a transmission element 35 secured to the two pistons 30, 32. The first chamber 29 is connected to the dispensing circuit 23, between the check valves 25, 27 as diagrammed in FIG. 17. Likewise, the second chamber 31 is connected to the dispensing circuit 22, between the check valves 24, 26 as diagrammed in FIG. 17. In the initial position, the pistons 30, 32 are arranged in the bottoms 29a, 31a of the chambers 29, 31, which are empty. When the actuation means 33 are activated, the pistons 30, 32 simultaneously move to the top 29b, 31b of the chambers 29, 31, which opens the first check valves 24, 25 and fills the chambers 29, 31 with air. The presence of the second check valves 26, 27 prevents the air and the ingredients present in the cavities 8a, 8b from being suctioned into said chambers 29, 31. This advantageously allows the operation to fill the chambers 29, 31 with air to be carried out concomitantly with the engagement of the needle holder 5 on the pod 4, or even after said engagement. When the preparation of the beverage is initiated, the actuating means 33 simultaneously move the pistons 30, 32 into the bottoms 29a, 31a of the chambers 29, 31, which opens the second check valves 26, 27 and injects air into the upper parts of the cavities 8a, 8b, thus allowing the ingredients to be transferred into the mixing chamber 17 simultaneously. While the first check valves 24, 25 prevent the air from ascending into the tanks 20, 21 during the descent of the pistons 30, 32. The volumes of air Va1, Va2 expelled from the chambers 29, 31 are proportional to the volumes of ingredients VI1, VI2 contained in the cavities 8a, 8b. These volumes of air Va1, Va2 are about 5% to 20% greater, preferably 20% greater, than the volumes of ingredients VI1, VI2. This ensures that all quantities of ingredients contained in the cavities 8a, 8b will be expelled.

FIGS. 10 to 16 illustrate in detail a preferred implementation of the air pump 28. A first part 36 comprises a bore 37 defining the first chamber 29, as illustrated by FIGS. 11 and 14. The bottom 37a of this bore 37 comprises a through opening 38 to which the dispensing circuit 23 is connected, as illustrated in FIGS. 10, 14 and 15. The piston 30 is slidably mounted in this bore 37 in a leak-tight manner by means of a first seal J1. A second part 39 also comprises a bore 40 defining the second chamber 31, as illustrated by FIGS. 11 and 12. The bottom 40a of this bore 40 also comprises a through opening 41 to which the dispensing circuit 22 is connected, as illustrated in FIG. 10. The piston 32 is slidably mounted in this bore in a leak-tight manner by means of a second seal J2. As illustrated in FIG. 16, this piston 32 comprises a bore 42 and a notch 43 which allow the piston 32 to be housed in the lower extremity 36a of the first part 36 by positioning the through opening 38 in the notch 43, when the piston 32 is in a high position in the second chamber 31, as illustrated in FIG. 11. The first part 36 and the second part 39 are joined together, the through opening 38 of the first part 36 corresponding to a second through opening 44 arranged in the upper portion 39a of the second part 39, as illustrated in FIG. 12, in order to allow the passage of the dispensing circuit 23 so that it can be connected to the through opening 38 of the first part 36. As illustrated in particular in FIG. 11, the two chambers 29, 31 and the two pistons 30, 32 are all coaxial with respect to each other, along a longitudinal axis X1.

The transmission element 35 comprises a support part 45 which is secured to the upper extremity 30a of the piston 30. The transmission element 35 also comprises three rods 46, 47, 48 mounted in slidable engagement along the longitudinal axis X1 in relation to the first part 36 which comprises for this purpose three holes 49, 50, 51 for passage of the rods 46, 47, 48, as illustrated in regard to FIGS. 14 to 16. The three rods 46, 47, 48 and the three holes 49, 50, 51 are uniformly distributed along the longitudinal axis X1. The lower extremities 46a, 47a, 48a of the three rods 46, 47, 48 are attached to the piston 32, and the upper extremities 46b, 47b, 48b of said rods are attached to the support part 45, as illustrated in FIGS. 15 and 16. The transmission element 35 also comprises a worm screw 52, illustrated in FIG. 11, which is driven in rotation about the longitudinal axis X1 by the motor 34, said elements being arranged along this longitudinal axis X1 with the other parts of the transmission element 35, coaxially with respect to the chambers 29, 31 and the pistons 30, 32. The support part 45 comprises a thread (not illustrated in detail). The air pump 28 also comprises a cage 53, illustrated in FIG. 13, which is attached above the second part 39, extending along the longitudinal axis X1. The motor 34 and the worm screw 52 are mounted in the upper part 53a of this cage 53. The worm screw 52 is guided in rotation in a mounting 53c arranged in the upper portion 53a. Thus, the actuation of the motor 34 allows the worm screw 52 to be driven in rotation, which causes the translational motion of the support part 45 and of the rods 46, 47, 48 along the longitudinal axis X1, in one direction or the other depending on the direction of rotation of the motor 34. Consequently, the pistons 30 and 32 move simultaneously in the chambers 29 and 31, respectively.

The dimensions of the bores 37, 40 on the first and second parts 36, 39 and the stroke of the pistons 30, 32 in these bores 37, 40 are determined in order to allow the chambers 29, 31 to be filled with two volumes of air Va1, Va2, which are about 5% to 20% greater, preferably 20% greater, than the volumes VI1, VI2 of ingredients contained in the cavities 8a, 8b of the pod 4, as explained previously.

As illustrated in FIGS. 10, 11 and 15, two sensors 54, 55 are arranged in the upper part 53a and in the lower part 53b of the cage 53, such that the support part 45 bears on these sensors 54, 55 when the pistons 30, 32 respectively reach the top 29b, 31b and the bottom 29a, 31a of the chambers 29, 31, which corresponds to the filling of the chambers 29, 31 with air and to the complete discharge of this air. These sensors 54, 55 consist, for example, of strip sensors. The machine 1 comprises a control circuit 100 which activates the motor 34 according to the triggering of these sensors 54, 55, as will be explained below.

The needle 6b on the needle holder 5 allows water to be injected into the channel 9 of the pod 4. This water injection is performed using a water dispensing device 56, diagrammed in FIG. 21. The dispensing device 56 comprises a tank 57 containing water, and a dispensing circuit 58 whose upstream extremity 58a is connected to the tank 57 and whose downstream extremity 58b is connected to the conduit 7b connected to this needle 6b. The dispensing device 56 comprises a first check valve 59 which is arranged at the upstream extremity 58a on the dispensing circuit 58. Likewise, the dispensing device 56 comprises a second check valve 60 which is arranged at the downstream extremity 58a on the dispensing circuit 58. These first and second check valves 59, 60 each comprise a seat 59a, 60a, a ball 59b, 60b, and a spring element (not illustrated), and are very sensitive in order to open and close very quickly, so as to perfectly control the quantity of water injected into the channel 9 on the pod 4.

Figure 21:
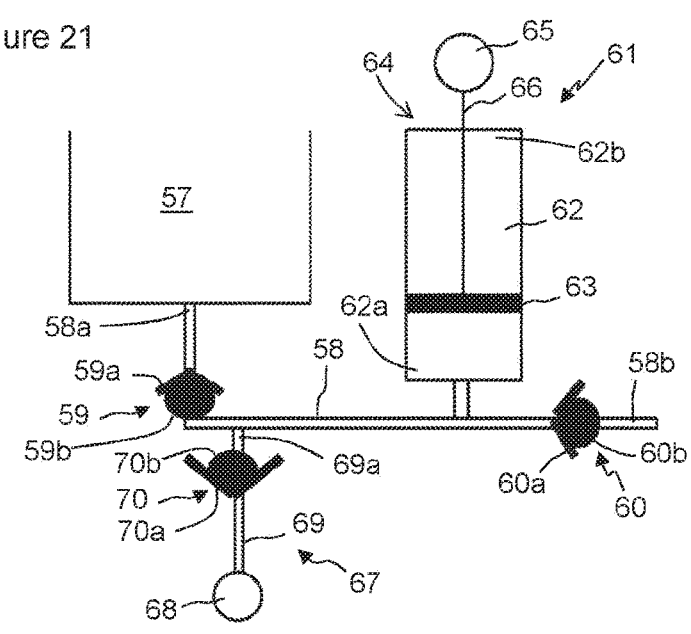

As diagrammed in FIG. 21, the dispensing device 56 comprises a water pump 61 which comprises a chamber 62 slidably receiving a piston 63. The piston 63 slides in a leak-tight manner into the chamber 62, by means of a third seal J3. The piston 63 is moved in the chamber 62 by means of actuating means 64 comprising a motor 65 and a transmission element 66 secured to the piston 63. The chamber 62 is connected to the dispensing circuit 58, between the check valves 59, 60 as diagrammed in FIG. 21. In the initial position, the piston 63 is arranged in the bottom 62a of the chamber 62, which is empty. When the actuating means 64 are activated, the piston 63 moves into the top 62b of the chamber 60, which opens the first check valve 59 and fills the chamber 62 with water, which is drawn from the tank 57. The presence of the second check valve 60 prevents ambient air or the air in the channel 9 of the pod 4 from being suctioned into the chamber 62. When the preparation of the beverage is initiated, the actuating means 64 move the piston 63 into the bottom 62a of the chamber 62, which discharges the water into the dispensing circuit 58 and opens the second check valve 60, then injecting the water into the channel 9 by means of the needle 6b. While the first check valve 59 prevents the discharged water from ascending into the tank 57 during the descent of the piston 63.

As diagrammed in FIG. 21, the dispensing device 56 comprises a purge system 67 which comprises an air pump 68 connected by means of
a conduit 69 downstream from the first check valve 59 to the dispensing circuit 58. A calibrated check valve 70 is arranged at the downstream extremity 69a of the conduit 69. This calibrated check valve 70 also comprises a seat 70a, a ball 70b and a spring element (not illustrated) which is dimensioned so that the calibration pressure is between 100 millibars and 500 millibars, guaranteeing that said valve 70 will open only when the air pump 68 is activated, and not during negative pressure generated by the suction of water into the chamber 62 from the water pump 61. After the water pump 61 has discharged the water into the dispensing circuit 58 and injected this discharged water into the channel 9 of the pod, the piston 63 is positioned in the bottom 62a of the chamber 62. However, residual water remains in the dispensing circuit 58, between the two check valves 59, 60. The purge system 67 is activated until the end of the step of discharging water by the water pump 61, which allows air to be injected into the dispensing circuit 58 between the two check valves 59, 60 and allows this residual water to be discharged by the downstream extremity 58b of the dispensing circuit 58. This residual water is also then injected into the channel 9 of the pod 4, in addition to the discharged water. Thus, the volume of water Ve1 injected into the channel 9 of the pod 4, allowing the beverage to be prepared, corresponds to the volume of water Ve2 discharged by the water pump 61 and to the residual volume of water Ve3 purged by the purge system 67.

Figure 18:
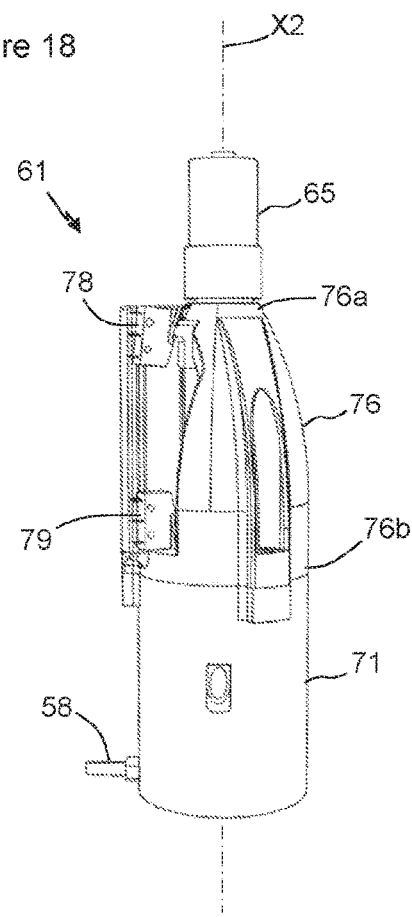
FIG. 18 illustrates an overall view of a water pumping system.
Figure 19:
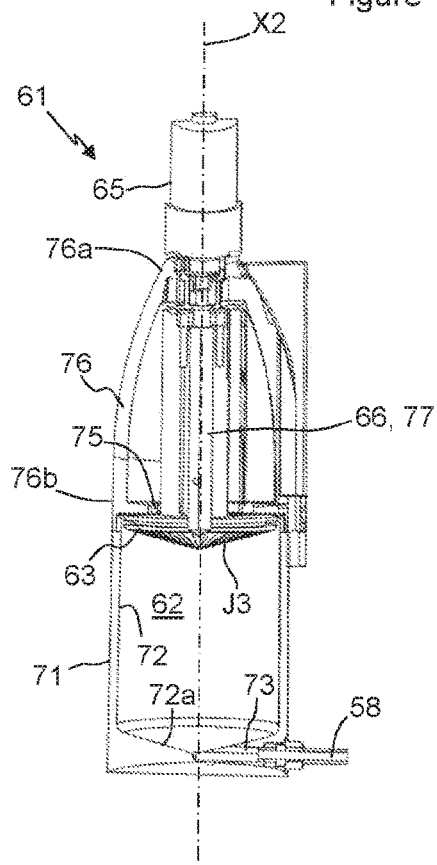
FIG. 19 illustrates an overall cross-sectional view of said pumping system.
Figure 20:
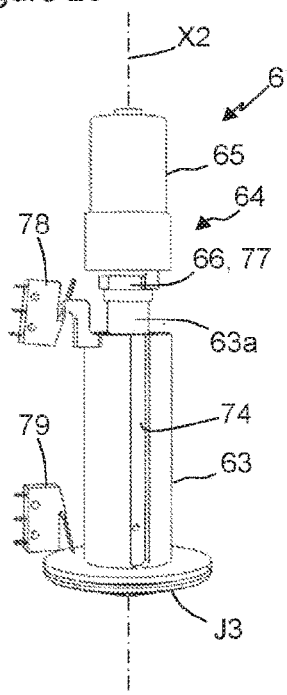
FIG. 20 illustrates the piston of the water pump and the piston position detection system, FIG. 21 diagrams the water dispensing device as a whole, showing these various components.

FIGS. 18 to 20 illustrate in detail a preferred implementation of the water pump 61. This comprises a part 71 comprising a bore 72 defining the chamber 62. The bottom 72a of this bore 72 comprises a through opening 73 to which the dispensing circuit 58 is connected. The piston 63, illustrated in FIGS. 19 and 20, is mounted in slidable engagement along a longitudinal axis X2 inside the bore 72, by means of guiding grooves 74 as illustrated in FIG. 20, in which is engaged a tooth 75 arranged on a cage 76 which is attached above the part 71. Preferably, three guiding grooves 74 and three corresponding and uniformly distributed teeth 75 are provided on the piston 63 and on the cage 76. This cage 76 receives in the upper part 76a the motor 65 and the transmission element 66 which consists of a worm screw 77, which extends along the longitudinal axis X2 and is secured to the motor 65, as illustrated by FIGS. 19 and 20. The piston 63 comprises an upper extremity 63a equipped with a thread (not illustrated) allowing it to be engaged on the worm screw 77. The rotation of the motor 65 in one direction or the other drives the rotation of the worm screw 77 about the longitudinal axis X2, which results in a translational movement of the piston 63 along the longitudinal axis X2, which moves toward the bottom 62a or the top 62b of the chamber 62, according to the direction of rotation of the motor 65.

As illustrated in FIGS. 18 and 20, two sensors 78, 79 are arranged in the upper part 76a and in the lower part 76b of the cage 76. The piston 63 comprises a tab 80 which bears on these sensors 78, 79 when the piston 63 is arranged in the top 62b or, on the contrary, in the bottom 62a of the chamber 62. The adjustment position of these sensors 78, 79 on the cage 76 therefore depends on the stroke of the piston 63 in the bore 72 of the part 71. These sensors 78, 79 are, for example, strip sensors. This design permits the filling and discharging of a single volume of water Ve2 by the water pump 61. However, we could envision a design variant comprising a third sensor (not illustrated) arranged between the two sensors 78, 79 and making it possible to detect an intermediate position of the piston 63 in the chamber 62, which then allows the filling and discharging of two volumes of water Ve2a, Ve2b and thus, once the residual volume of water Ve3 has been purged, allows two volumes of water Ve1a and Ve2a to be injected into the channel 9 of the pod 4. Other variants may be envisioned, with several sensors arranged between the two sensors 78, 79, according to the desired number of volumes of water to inject.

The machine 1 also comprises a control circuit 100 which manages in particular the activation of the motor 34 on the air injection device 19, and the motor 65 and the air pump 68 on the water dispensing circuit 56, according to the information received by the sensors 54, 55 on the air pump 28 of the air injection device 19 and by the sensors 78, 79 on the water pump 61. The control circuit 100 activates the motors 34 and 65 to carry out, respectively, the filling with air of the chambers 29 and 31 on the air pump 28 and the filling with water of the chamber 62 on the water pump 61. The water filling will take into account the type of pod 4, when the filling of at least two volumes of water Ve1a, Ve2b is possible on the machine 1, as explained previously. Once the air and water fillings have been performed, the control circuit 100 activates the motors 34, 65 in the reverse direction to carry out simultaneously the discharging of the air contained in the chambers 29, 31 and the discharging of the water contained in the chamber 62. When the piston 63 reaches the bottom 62a of the chamber 62 on the water pump 61, activating the sensor 79, the control circuit 100 cuts the motor 65 and activates the air pump 68 of the purge system 67, which empties the residual water in the dispensing circuit 58, as explained previously. Concomitantly, the pistons 30, 32 continue their strokes in the chambers 29, 31 of the air pump 28 of the air injection device 19, until the sensor 55 is activated, the control circuit 100 then cutting the motor 34 and the air pump 68.

The speeds of displacement of the pistons 30, 32 on the air pump 28 and that of the piston 63 on the water pump 61, as well as the strokes of these pistons 30, 32, 63, influence the activation durations of the motors 34, 65. Likewise, the residual volume of water Ve3 to purge influences the activation duration of the air pump 68 of the purge system 67. All parameters are adapted to activate the motor 65 of the water pump 61 during a time T1 and then to activate the air pump 68 during a time T2, and to activate simultaneously the motor 34 of the air pump 28 during a time T1+T2. This guarantees that the ingredients and water in the mixing chamber 17 flow on the pod 4 in a synchronized manner, ensuring that a homogeneous beverage flows from the outlet of the pod 4.

The preceding description is not restrictive in nature, numerous variants being possible without departing from the context of the invention. For example, one could provide for implementation variants for the air injection device 19, in particular concerning the design of the air pump 28. The design of the air pump 28 will depend in particular on the number of cavities present on the pod 4. The number of needles will also be adapted, according to the type of pod 4 that may be used to prepare beverages and the number of cavities containing ingredients. In this case, the air injection device 19 will be adapted to comprise as many chambers each receiving a piston, the pistons being actuated simultaneously, the volumes of the chambers being adapted according to the volumes of ingredients in each of the cavities of the pod 4.

One can also provide for a different arrangement of the chambers 29, 31 and of the pistons 30, 32 of the air injection device 19, while providing for a simultaneous movement of these pistons 30, 32.

One could also provide for a variant of the air injection device 19, where the air tanks 20, 21 would be eliminated, the downstream extremities 22a, 23a of the dispensing circuits 22, 23 being left in contact with the ambient environment from which the air is drawn for filling the chambers 29, 31.

One can also provide for an air injection device 19 comprising only one piston and one chamber, when the pod comprises a single cavity containing one ingredient. In this case, the injection of air and the dispensing of water in the pod 4 will also be synchronized by means of the control circuit on the machine 1.

The entire frame 2 is not represented in FIG. 1. However, the frame 2 comprises an additional volume allowing the integration of the water dispensing device 56 and of the air injection device 19.

In one embodiment, the machine 1 allows cold beverages to be prepared. However, one can envision embodiment variants for the preparation of hot beverages, the machine 1 being in this case equipped with a hot water production device heating the water prior to its dispensing.

The invention claimed is:

1. A machine for dispensing beverages from a pod comprising a first cavity and at least a second cavity, the first cavity containing a first volume of ingredients forming part of a composition of a beverage and the at least second cavity containing a second volume of ingredients forming part of the composition of the beverage, the second volume of ingredients being different from the first volume of ingredients, wherein said machine comprises an air injection device comprising an air pump comprising two chambers and two pistons slidably mounted respectively in the two chambers, a first chamber of the two chambers being configured to supply a first volume of air and a second chamber of the two chambers being configured to supply a second volume of air, the second volume of air being different than the first volume of air, wherein the first volume of air supplied by the first chamber is adapted to the first volume of ingredients in the first cavity and wherein the second volume of air is adapted to the second volume of ingredients in the at least second cavity, and an actuator configured to actuate the two pistons simultaneously in a synchronized manner to thus supply the first and second volumes of air in a synchronized manner to the first and second cavities, respectively.

2. The machine according to claim 1, wherein the actuator comprises at least one motor and at least one transmission element configured to maneuver the two pistons concomitantly.

3. The machine according to claim 2, wherein the actuator comprises only one motor and only one transmission element configured to maneuver the two pistons concomitantly.

4. The machine according to claim 1, wherein the two chambers and the two pistons are all coaxial.

5. The machine according to claim 4, wherein the actuator comprises a single motor and a single transmission element configured to maneuver the two pistons concomitantly and wherein the motor, the transmission element, the two chambers and the two pistons are all coaxial.

6. The machine according to claim 1, wherein the injection device comprises two air tanks, two dispensing circuits whose upstream extremities are connected respectively to the two tanks, the two chambers of the air pump being connected respectively to the two dispensing circuits and two first check valves arranged respectively on the two dispensing circuits between the tanks and the pump.

7. The machine according to claim 6, wherein the injection device comprises two second check valves arranged respectively on the dispensing circuits between the air pump and downstream extremities of said dispensing circuits.

8. The machine according to claim 1, wherein the volumes of air supplied to the cavities are greater than the volumes of ingredients contained in said cavities by about 5% to about 20%.

9. The machine according to claim 1, further comprising a water dispensing device configured to dispense at least one defined volume of water into the pod, which comprises a tank, a dispensing circuit connected at its upstream extremity to the tank, and a pumping system arranged on the dispensing circuit.

10. The machine according to claim 9, wherein the pumping system comprises:
 a water pump equipped with a chamber connected to the dispensing circuit, and a piston slidably mounted in a leak-tight manner in the chamber of the water pump,
 a second actuator configured to actuate the piston mounted in the chamber of the water pump, so as to suction at least one volume of water and to discharge said at least one volume of water,
 a first check valve arranged on the dispensing circuit between the tank and the water pump, and
 a second check valve arranged on the dispensing circuit between the pump and a downstream extremity of said dispensing circuit.

11. The machine according to claim 10, wherein the water dispensing device comprises a purge system configured to purge a volume of water contained in the dispensing circuit downstream from the first check valve.

12. The machine according to claim 11, which is configured so that the water pump discharges a volume of water, and the volume of purged water added to the volume of water constitute the volume of water allowing the beverage to be prepared.

13. The machine according to claim 10, wherein the dispensing device comprises a system for detection of a position of the piston in the chamber of the water pump, configured to act on the second actuator, so that the water pump is able to suction and discharge at least two volumes of water.

14. The machine according to claim 9, further comprising a control circuit configured to activate concomitantly the injection device and the water dispensing device.

15. The machine according to claim 11, which is configured so that the water pump discharges a volume of water, and the volume of purged water added to the volume of water constitute the volume of water allowing the beverage to be prepared, wherein the control circuit is configured to activate the injection of a volume of water during a time T1, and then the purge of the dispensing circuit during a time T2, and the injection of air into the pod during the time that corresponds to a sum of T1+T2.

16. The machine according to claim 8, wherein the volumes of air supplied to the cavities are 20% greater than the volumes of ingredients contained in said cavities.

17. The machine according to claim 1, wherein the machine comprises a receptacle for receipt of the pod, the receptacle being configured for articulation in relation to a frame between an open position and a closed position, wherein the open position allows for receipt of the pod in the receptacle, and wherein the closed position allows for injection of air into the pod.

18. The machine according to claim 1, further comprising a needle holder configured for engagement with the pod and needles configured to perforate the pod.

19. The machine according to claim 18, wherein a surface gasket is provided on the needle holder, the surface gasket configured to contact the pod, and wherein the needles are configured to pass through the gasket when the needle holder is engaged with the pod.

* * * * *